July 8, 1941.  H. H. MILLER  2,248,433
FLOAT VALVE
Filed March 30, 1940
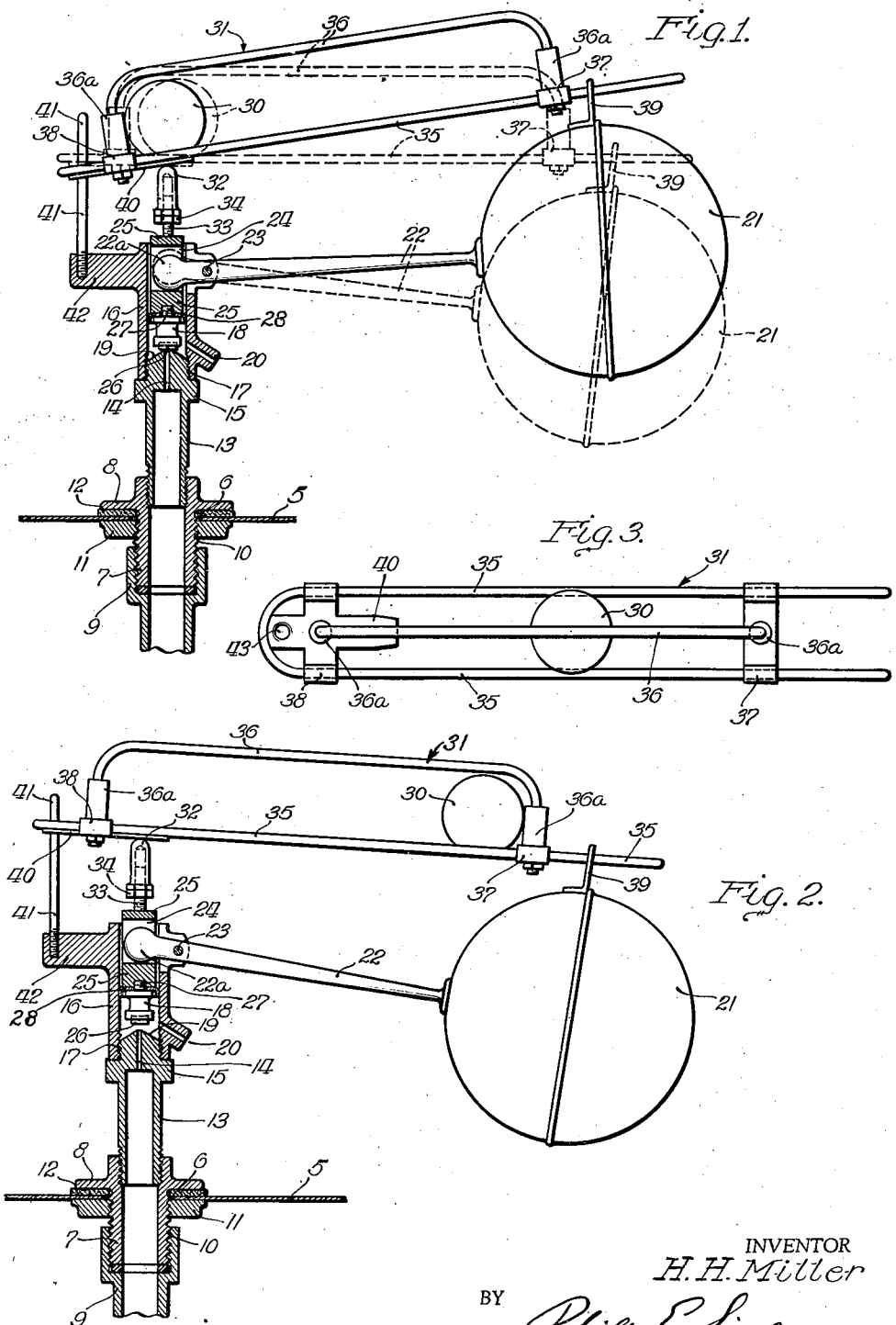
INVENTOR
H. H. Miller
BY
Philip P. Ziggen
his ATTORNEY.

Patented July 8, 1941

2,248,433

UNITED STATES PATENT OFFICE 2,248,433

FLOAT VALVE

Henry H. Miller, Lincoln, Nebr.

Application March 30, 1940, Serial No. 326,899

6 Claims. (Cl. 137—104)

This invention relates to float valves, and among other objects, aims to provide an improved float valve which is especially useful in maintaining a nearly constant level of water in the evaporating pans of hot air furnaces, without overflowing said pans. However, the float valve of the present invention has other uses and advantages, as the following description of a preferred embodiment of the invention will make apparent to those skilled in the art. In the accompanying drawing forming a part of this specification—

Fig. 1 is a vertical sectional elevation of the improved float valve, shown closed, showing in dotted lines an alternative position of the float and certain parts connected thereto, a fragment of the tank which houses the float valve also being shown;

Fig. 2 is a view like Fig. 1 but showing the valve open;

Fig. 3 is a top plan of the ball weight and its frame.

Referring particularly to the drawing, the improved float valve is shown secured to the bottom 5 of a tank which is connected by a pipe to the evaporating pan (not shown) of a hot air furnace (not shown) the arrangement being such that the level of water in the tank determines the level of water in the evaporating pan, as will be understood without illustration. The tank bottom 5 is perforated as at 6 and a valve base 7 having an integral flange 8 is thrust through the perforation 6 to extend outside the tank, so that a water supply pipe coupling or union 9 may be screwed on threads 10. A nut 11 is threaded on the valve base and co-operates with a gasket 12 underneath flange 8 to seal the joint. The entire float valve is shown supported on the valve base 7 which in turn is rigidly secured upon the tank bottom 5.

Screwed into the upper end of valve base 7 is a valve body tube 13 having a small orifice 14 at its upper end. A flange 15 integral with the valve body tube may be hexagonal on its periphery to facilitate tightening or loosening the valve body tube, said flange 15 also providing a shoulder for supporting a hollow valve chamber 16. Screw threads 17 on the lower end of valve chamber 16 co-operate with like threads on the upper end of the orifice member 13 to hold the valve chamber assembled upon and in communication with the orifice member. The orifice 14 discharges into the valve chamber when permitted to do so, a valve 18 in the valve chamber normally being seated on the conical end 19 of the valve body tube 13 to seal said orifice. On the valve chamber a discharge spout 20 is formed, to deliver water from the interior of the valve chamber to the tank. The valve body tube with its orifice is obviously a replaceable orifice member whose orifice determines the amount of fluid which may be discharged from spout 20.

To control the valve 18, and hence flow of water into the tank, a float 21 of conventional construction is secured on the outer end of a lever 22 pivoted as at 23 on the valve chamber 16. The inner end 22a of lever 22 is preferably rounded or spherical and is received within a slot 24 provided in the upper end of a plunger 25 which reciprocates within the valve chamber. Valve 18 is on the inner or lower end of plunger 25. The slot 24 is longer than the diameter of the inner rounded end 22a of the float lever, so that said inner end may swing through a certain angle without pressure on the plunger 25. The dotted line position of the parts in Fig. 1 will make this clear: the float has dropped, thus lifting the inner end 22a without lifting the plunger and hence the valve 18. The seating end of valve 18 may have a washer 26 which directly contacts the upper, conical end 19 of the orifice member, to seal the orifice, and the opposite end of valve 18 may have a reduced screw threaded end 27 which screws into a tapped bore in the lower end of plunger 25. A cup washer 28 is interposed between valve 18 and plunger 25 and is held on the lower end of the plunger by the valve when screwed tight, said cup washer thus sealing the upper end of the hollow valve chamber 16 whatever the position of the plunger 25. Obviously the inner end 22a of the float lever prevents the plunger from moving out of the valve chamber responsive to water pressure.

From the foregoing, it is clear that the size of the orifice and the pressure of the source of liquid will control the volume of flow of liquid into the tank, hence into the evaporating pan; therefore, by installing an orifice member having a properly sized orifice, approximately the same amount of water per unit of time will be delivered to the evaporating pan regardless of differences in water mains pressure in different cities, or in different parts of the same city. It will also be clear that a noticeable drop in the water level of the tank must take place before the float lever will open the valve to replenish the supply of water. This is desirable to prevent constant drip feed of the water, which may lead to corrosion and operating troubles. A quick flow of water for a short time, followed by a relatively long period during which the valve is closed, is the preferred operation, and this is assured by the illustrative construction and arrangement of parts.

To make the valve open and close equally quickly so there can never be a dribble or drip feed, and to hold the valve tightly closed, a massive solid metal ball weight 30 is carried on a ball race or guide frame 31 which tilts on an adjustable fulcrum provided by the rounded top of screw cap 32, said screw cap being screwed on a stud 33 projecting from the upper end of plunger 25. As the plunger rises and falls, obviously said fulcrum moves with it. A lock nut 34 holds the adjustment of the screw cap 32.

The ball race 31 preferably comprises a pair of parallel rods 35 (which may be the ends of a single rod bent in its middle, as shown in Fig. 3) and a single upper rod 36 located in a medial plane between rods 35 and spaced so close to rods 35 that the ball weight 30, once in the race, can not escape therefrom unless the race is partly disassembled. The ends of rod 36 are bent downwardly at right angles toward rods 35 and are received within tie members 37, 38 which surround rods 35 and are secured to them. Beyond tie member 37, the free ends of rod or rods 35 extend, and a connector 39 having perforations for rods 35 is slipped over said free ends and thus connects the float 21 with the race. Connector 39 may be soldered or brazed on the top of the float. Thus the float, as it rises and falls, forces the ball race to tilt on its fulcrum, and the ball moves back and forth in the race, always seeking the end which is the lower. Rubber bumpers 36a on the ends of rod 36 are employed to deaden the sound of the ball as it strikes against said rod ends. On the bottom of tie member 38 is a rigidly mounted rider 40 which rests directly on the rounded upper end of the screw cap or fulcrum 32. To guide the ball race as it swings, a rod 41, secured upright on an arm 42 integral with the valve chamber, is passed through a perforation 43 (Fig. 3) in the rider 40. The rigidity of the bearing of the float lever 22 on its pivot 23 obviously constrains the float lever to swing only vertically, and as the float lever is connected through the float with the ball race, the latter is guided at its outer as well as inner end during its rocking on the fulcrum.

When the tank is full, the parts are in the positions shown in full lines in Fig. 1; and even after the water level has dropped appreciably, until the float is in the dotted line position (Fig. 1), the valve remains seated, as clearly shown. In said dotted line position, the weight of the ball 30 is transmitted through the rider 40 to the plunger 25 to hold the valve seated against the water pressure. This valve-holding action may be independent of any thrust exerted by the inner end of the float lever, or in other words, the ball weight will hold the valve closed, to stop flow of water, when the float would permit water pressure to lift the valve to discharge water into the tank. However, when the float descends so far that the water in the tank is quite low, the float-attached end of the ball race tilts downwardly under the weight of the float and the ball rolls to the extreme end of the race, while the water pressure lifts plunger 25 until the parts are in the positions shown in Fig. 2, and water discharges through spout 20 into the tank. As the water rises in the tank, the float moves upwardly until it is in the dotted line position of Fig. 1, the ball weight, however being at the right hand end of the horizontal race and the valve still being open. But when the float rises still further, the race tilts, and the ball weight rolls to the left hand end of the race, whereupon the valve is immediately closed, and is held closed regardless of bobbing of the float on the water surface, or of minor fluctuations in the level of said surface.

Obviously, many changes may be made in the construction and arrangement of the parts. For instance, the side walls of the tank may support the device, instead of the bottom. The device may be used to control the level of liquids other than water. Nearly all the details of construction set forth in the foregoing may be changed or modified. The invention is therefore not limited to the illustrative form described above, but is defined by the following claims.

What is claimed is:

1. A float valve for controlling flow of liquid from a source of supply into a tank comprising, in combination, a valve member; an orifice member having an orifice whose discharge end is adapted to be closed by said valve member; a plunger carrying the valve member; an adjustable fulcrum member on the plunger; a ball race rockably supported near one end on said adjustable fulcrum; a ball weight movable longitudinally of the ball race as it rocks on said fulcrum; a float connected to the other end of the race; and a pivoted lever connecting the float with the plunger to control the position of the valve.

2. The invention according to claim 1, wherein there is a valve chamber enclosing the valve member and the discharge end of the orifice; a guide being secured to the valve chamber, said guide controlling movement of said race, which race is free of the adjustable fulcrum member though resting thereon.

3. The invention according to claim 1, wherein the float lever is pivoted near the plunger end and is ball-shaped at its extremity, said extremity being received within a plunger recess which is materially larger than the diameter of the ball-shaped extremity, so that a certain play or lost motion of the plunger relative to the extremity is permitted.

4. The invention according to claim 1, wherein the ball race has a rider which rests on the top end of the adjustable fulcrum member; the float being slidably connected to the race and the lever guiding the race as it tilts on its fulcrum.

5. A float valve comprising, in combination, an orifice member having an orifice connected to a source of liquid supply; a valve adapted when seated to close said orifice; means acting responsive to changes in liquid levels to lift said valve wide open or to close said valve tightly; said means comprising a float, a float lever attached to the float, a ball weight, and a race in which the ball weight rolls; said race being tiltable and being directly connected with the float, and the float lever directly connecting the float and the valve; the parts being so constructed and arranged as to obviate any position permitting drip flow past said valve; the ball weight, when at one extremity of the race, being directly over the valve, and a fulcrum, on which the race tilts, being connected to the valve and transmitting the gravity thrust of the ball weight directly down upon the valve and its seat adjacent said orifice.

6. A float valve comprising, in combination, an orifice member having an orifice connected to a source of liquid supply; a valve adapted when seated to close said orifice; means acting responsive to changes in liquid levels to lift said valve wide open or to close said valve tightly; said means comprising a float, a float lever attached to the float, a ball weight, and a race in which the ball weight rolls; said race being tiltable and being directly connected with the float, and the float lever directly connecting the float and the valve; the parts being so constructed and arranged as to obviate any position permitting drip flow past said valve; the valve being on the inner end of a plunger movable in the valve chamber, and a fulcrum being on the outer end of said plunger; the race resting on the outer end of the fulcrum and being lifted when the plunger is lifted by the water pressure.

H. H. MILLER.